(12) United States Patent
Koike (10) Patent No.: US 6,395,172 B1
(45) Date of Patent: May 28, 2002

(54) WATER PURIFYING APPARATUS

(75) Inventor: Hiroyuki Koike, Kanagawa-ken (JP)

(73) Assignee: Calfa Chemical Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/544,986

(22) Filed: Apr. 7, 2000

(51) Int. Cl.[7] .................................................. C02F 9/00
(52) U.S. Cl. .................... 210/282; 210/449; 210/502.1; 210/503
(58) Field of Search ............................... 210/198.1, 282, 210/449, 502.1, 503, 484, 290; 502/407

(56) References Cited

U.S. PATENT DOCUMENTS

| | | | | |
|---|---|---|---|---|
| 439,091 A | * | 10/1890 | Bach | 210/484 |
| 1,981,307 A | * | 11/1934 | Burhans | 210/484 |
| 4,172,796 A | * | 10/1979 | Corder | 210/238 |
| 4,931,078 A | * | 6/1990 | Yamamoto | 71/67 |
| 5,182,018 A | * | 1/1993 | Langston | 210/282 |
| 5,330,770 A | * | 7/1994 | Kuno | 424/618 |
| 5,549,822 A | * | 8/1996 | Ferguson | 210/449 |
| 5,616,243 A | * | 4/1997 | Levy | 210/282 |
| 5,653,868 A | * | 8/1997 | Yanou et al. | 210/459 |
| 5,795,471 A | * | 8/1998 | Naito | 210/449 |
| 5,914,043 A | * | 6/1999 | Farley | 210/668 |
| 6,096,197 A | * | 8/2000 | Hughes | 210/449 |
| 6,123,837 A | * | 9/2000 | Wadsworth et al. | 210/449 |
| 6,145,670 A | * | 11/2000 | Risser | 210/449 |
| 6,214,224 B1 | * | 4/2001 | Farley | 210/282 |
| 6,241,893 B1 | * | 6/2001 | Levy | 210/282 |

FOREIGN PATENT DOCUMENTS

| | | | | |
|---|---|---|---|---|
| AU | 8537707 A | * | 10/1985 | |
| JP | 55112370 A | * | 8/1980 | |
| JP | 59149696 A | * | 11/1985 | |
| JP | 09348458 A | * | 5/1999 | |
| JP | 2000042569 A | * | 2/2000 | |

* cited by examiner

*Primary Examiner*—Duane Smith
*Assistant Examiner*—Frank M. Lawrence
(74) *Attorney, Agent, or Firm*—Lowe Hauptman Gilman & Berner, LLP (57) ABSTRACT

The water purifying apparatus has a hollow container and a purifying material provided therein. In the purifying material, the ratio by weight of the bulky water-soluble non-crystalline substance and activate carbon is about 1:1.5. The hollow container is disposed in a water channel.

14 Claims, 9 Drawing Sheets

WATER PURIFYING APPARATUS

FIELD OF THE INVENTION

The present invention relates to an apparatus for purifying water, and particularly for reforming hard water into soft water, and preferably used for bactericidal or antibacterial purpose of microbes in water, in particular, Legionella, and more specifically it relates to a water purifying apparatus for using water preferably as non-drinking water, such as water for washing hair, washing face, bathing, or showering (hereinafter called household water).

BACKGROUND OF THE INVENTION

As has been well known, various types of water purifying apparatus have been developed. Among those on market, activated carbon, ion exchange resin film, a kind of granite porphyry (so called "Bakuhan-seki" in Japanese) and the like are used as the filter medium. They are commercially available as the means for purifying drinking water to be so-called sweet water.

SUMMARY AND OBJECTS OF THE INVENTION

Aside from drinking water, a huge volume of household water has been consumed. The household water is highly demanded to be purified for the purpose of not only health and beauty, but also reformation from hard water to soft water and prevention of infection of the body by Legionella and other bacteria. By the related art using such filter medium, it was not suited or not sufficient for reforming the household water from hard water to soft water, and there has been almost no effective substance except chlorine compounds for the bactericidal or antibacterial purpose of Legionella.

It is hence an object of the invention to present a water purifying apparatus, not only capable of purifying water, but also preferably capable of providing water with buffering property (buffering effect), that is, making water mild (less stimulating), reforming household water from hard water to soft water, and having bactericidal or antibacterial effect.

The water purifying apparatus is the one for passing water into the purifying material provided in a hollow container, and the purifying material is composed of water-soluble non-crystalline material and activated carbon, and the ratio by weight thereof is about 1:1.5.

The water-soluble non-crystalline substance is a bulky material.

The composition of the water-soluble non-crystalline material includes 5.00 to 30.0% of silica, 7.00 to 30.0% of boron, 3.00 to 25.0% of sodium, and 0.30 to 1.80% of silver.

The composition of the water-soluble non-crystalline material includes 12.00 to 60.0% of silica, 6.00 to 50.0% of sodium, and 0.30 to 1.80% of silver.

The composition of the water-soluble non-crystalline material includes 12.00 to 60.0% of silica, 6.00 to 50.0% of calcium, and 0.30 to 1.80% of silver.

The composition of the water-soluble non-crystalline material includes 12.00 to 60.0% of silica, 6.00 to 50.0% of potassium, and 0.30 to 1.80% of silver.

The hollow container is formed by coupling a first case and a second case.

The hollow container is composed of an accommodating body having a lid forming multiple water passing holes at both ends.

The purifying material is put in an accommodating bag made of water permeable cloth or the like.

The hollow container is disposed in a water channel.

The hollow container is disposed in a shower head main body.

An amorphous material is used as the water-soluble non-crystalline material contained in the water purifying apparatus for purifying water, which will be described in detail. Generally, viscosity of a molten material increases as the temperature declines, and therefore when cooling quickly from molten state, the state of disorderly distribution of atoms is suddenly transformed into an immobile state of atoms at high viscosity. By such quenching process, the substance to be crystallized by the ordinary method is transformed into the substance where atoms are disorderly arranged.

Such substance is generally called an amorphous. The amorphous substance has a characteristic property not obtained in the conventional crystalline substance due to irregularity of arrangement of atoms. Soft magnetic characteristic, high corrosion resistance, and high strength are amorphous properties excellent also from the practical viewpoint. In order to make use of such amorphous characteristics, so far, applications have been attempted in the fields of magnetic core, magnetic filter, magnetic shield, sensor, strength material and compound material. The invention makes use of the amorphous characteristics of the water purifying material.

DETAILED DESCRIPTION OF THE INVENTION

A first embodiment of the invention is described in detail below, referring to the accompanying drawings. In FIG. 1 to FIG. 4, a water purifying apparatus 12 is directly disposed on the way of the water channel.

Figure 1:
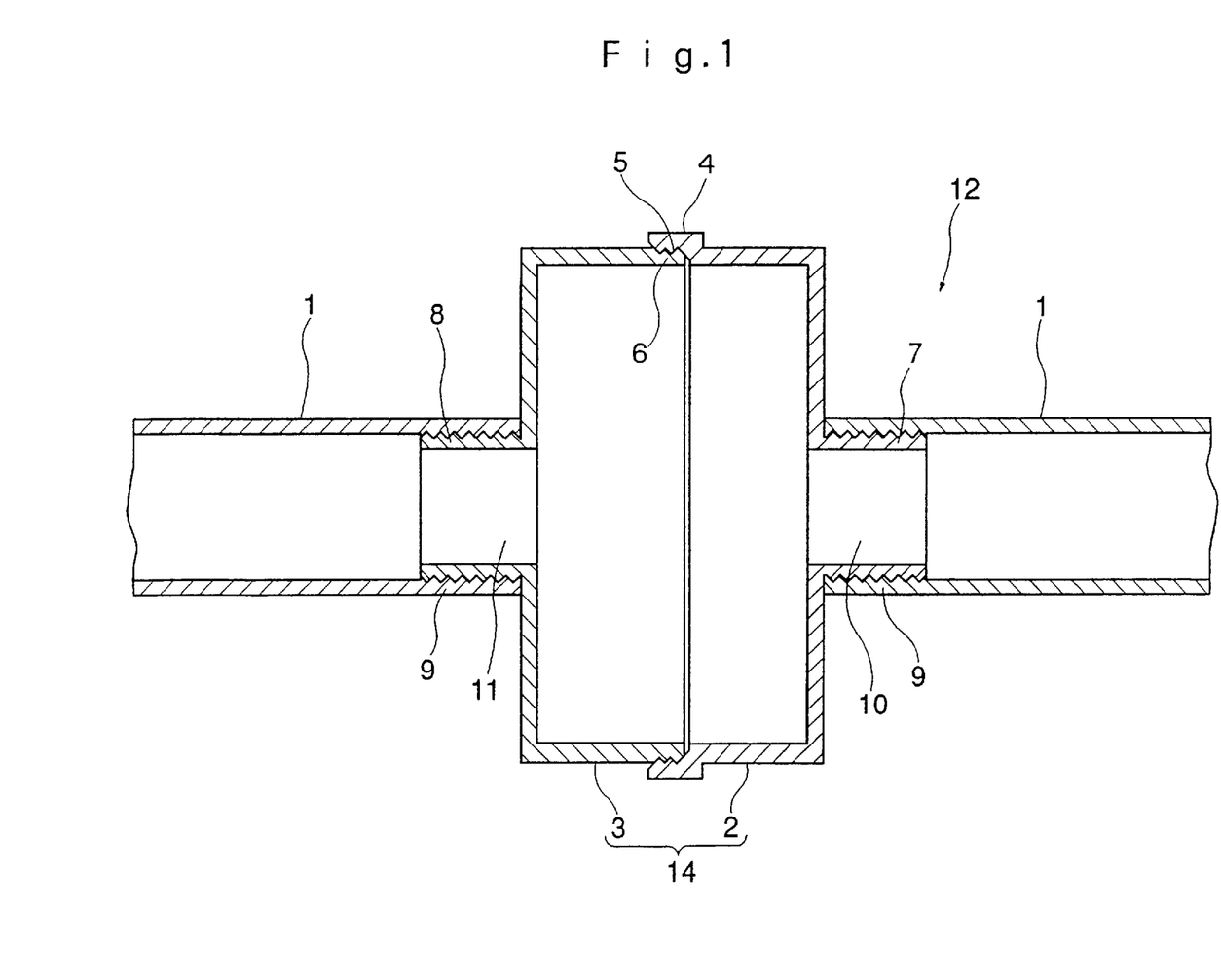
FIG. 1 is a sectional view showing a water purifying apparatus of the invention.
Figure 2:
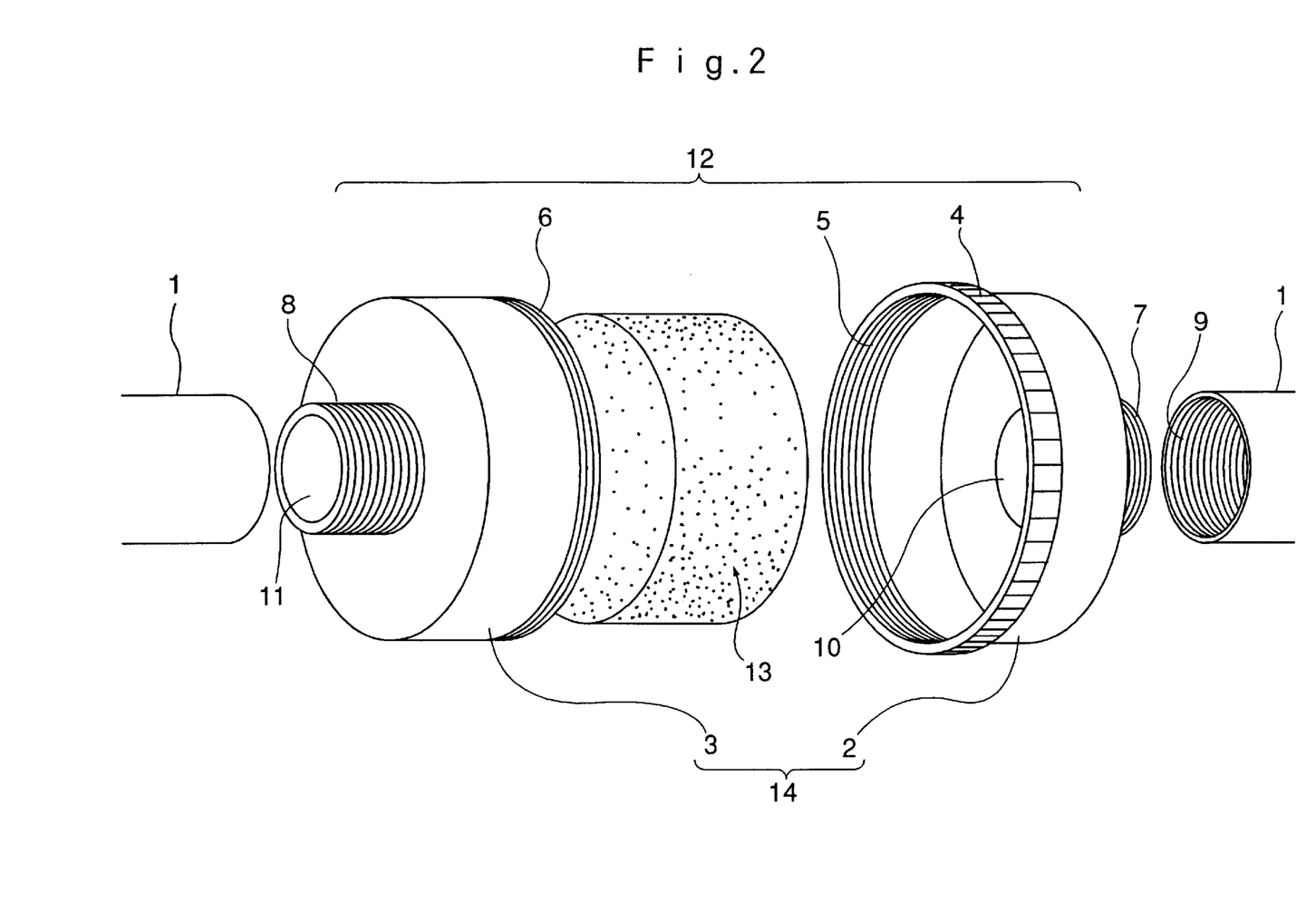
FIG. 2 is an exploded perspective view showing the water purifying apparatus of FIG. 1.
Figure 3:
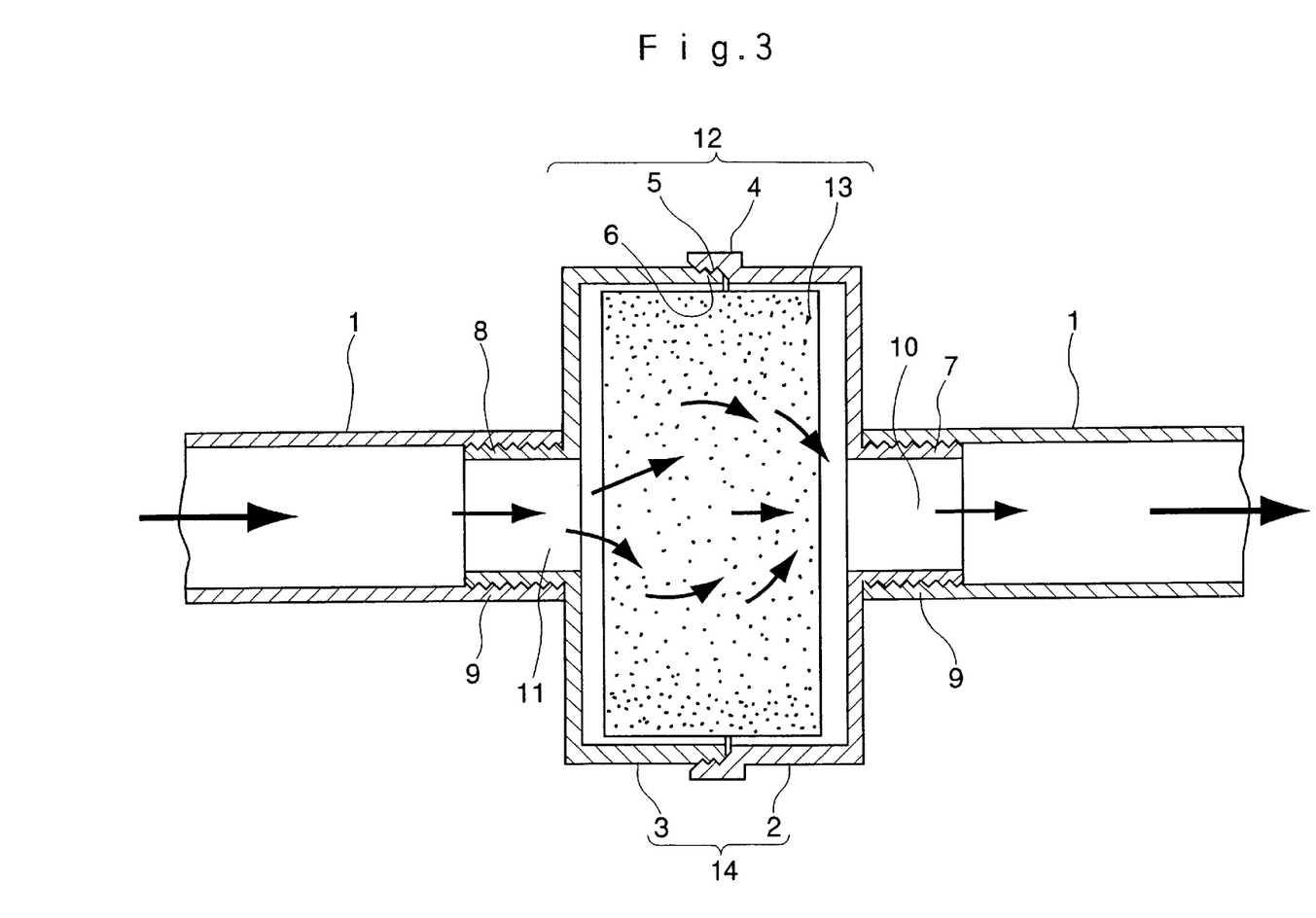
FIG. 3 is a sectional view showing the water purifying apparatus disposed on the way of a water channel.

Herein, FIG. 1 is a sectional view of a water purifying apparatus 12 containing no water-soluble non-crystalline substance 13 as a purifying material in a hollow container 14, which is disposed directly on a water service pipe 1. FIG. 2 is an exploded perspective view of the water purifying apparatus 12 containing the water-soluble non-crystalline substance 13 as the purifying material, which is disposed on the water service pipe 1. FIG. 3 is a sectional view of the water purifying apparatus 12 disposed on the way of the water service pipe 1, which allows household water to pass therethrough.

In FIGS. 1, 2 and 3, the hollow container 14 has a hollow front case 2 and a hollow rear case 3. The front case 2 has a threaded portion 5 in the inner peripheral surface at its one end. The rear case 3 has a threaded portion 6 in the inner peripheral surface at its one end. Thus, the threaded portion 5 of the front case 2 and the threaded portion 6 of the rear case 3 are coupled together. The front case 2 is provided with an anti-slipping portion 4 on the threaded portion 5.

The other end of the front case 2 has an extended portion 7. The extended portion 7 constitutes a flow outlet 10 having a convex section for passing household water from the container 14 into the water service pipe 1. The outer peripheral surface of the extended portion 7 has a threaded portion 9 by which the front case 2 is connected with the water service pipe 1.

The other end of the rear case 3 has an extended portion 8. The extended portion 8 constitutes a flow inlet 11 having a convex section for passing household water from the container 14 into the water service pipe 1. The outer peripheral surface of the extended portion 8 has the threaded portion 9 by which the front case 2 is connected with the water service pipe 1.

The hollow portion of the hollow container 14 contains the purifying material. When the front case 2 and the rear case 3 are combined, the purifying material is set in the space defined by the front case 2 and rear case 3. In this way, the water purifying apparatus having the hollow container 14 is completed by coupling the threaded portion 5 of the front case and threaded portion 6 of the rear case.

Further, the mounting threaded portion 9 formed on the outer peripheral surface of the flow inlet 11 provided at one side of the container 14 of the water purifying apparatus 12, and the mounting threaded portion 8 formed on the outer peripheral surface of the flow outlet 10 provided at the other side are coupled to the water service pipe threaded portion formed at an opening of the water service pipe 1, respectively. Hence, the water purifying apparatus 12 is disposed on the way of the water service pipe 1.

Thus, the household water flowing in from one water service pipe 1 flows into the water purifying apparatus 12 through the flow inlet 11. The household water flowing into the water purifying apparatus 12 is brought into contact with the water-soluble non-crystalline substance 13 as the purifying material, and flows out into the other water service pipe 1 through the flow outlet 10. Consequently, the hard household water flowing into the water purifying apparatus 12 from one water service pipe 1 is brought into contact with the water-soluble non-crystalline substance 13 in the water purifying apparatus 12. Upon contact, ions are released into water such that the household water is reformed into soft water. Then the soft household water flows out from the water purifying apparatus 12, and flows into the other water service pipe 1.

Figure 4:
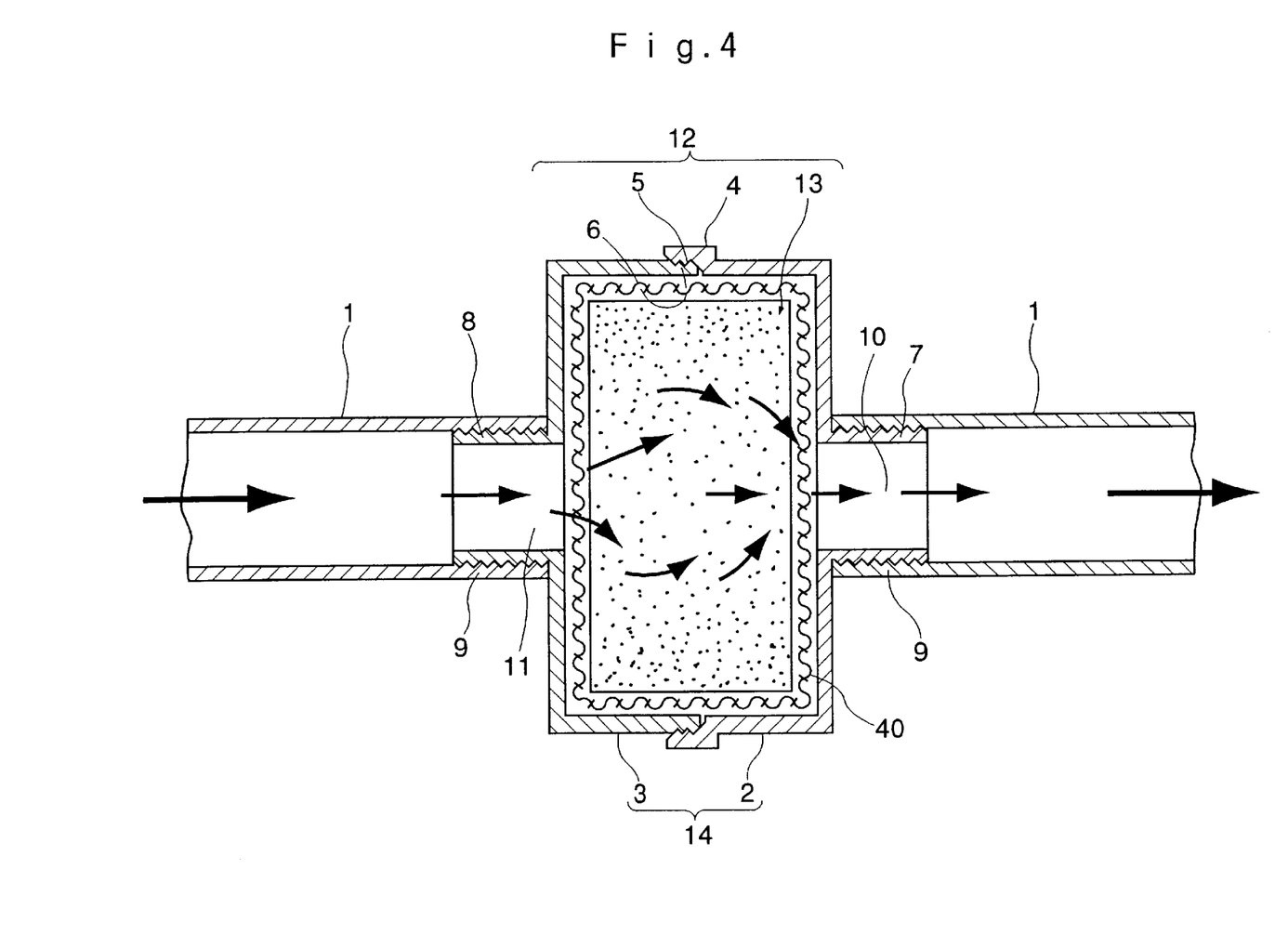
FIG. 4 is a sectional view showing an example of use of the water purifying apparatus disposed on the way of the water channel.

FIG. 4 shows a modification of the water purifying apparatus shown in FIG. 1. In the drawing, the water-soluble non-crystalline substance 13 is put into an accommodating bag 40 made of water permeable cloth or the like. The accommodating bag 40 is set in the hollow container 14 of the water purifying apparatus 12. The drawing is a sectional view of passing water into the water purifying apparatus 12 disposed on the way of the water service pipe 1. When the household water passes through bulk of the water-soluble non-crystalline substance 13, it is dissolved to release its components into water. Thus, the bulk of the water-soluble non-crystalline substance 13 gradually becomes smaller. Even if the bulk of the water-soluble non-crystalline substance 13 becomes small enough to pass through the water service pipe 1, it cannot flow out to the outside through the water service pipe 1 so long as it is contained in the accommodating bag 40.

Figure 5:
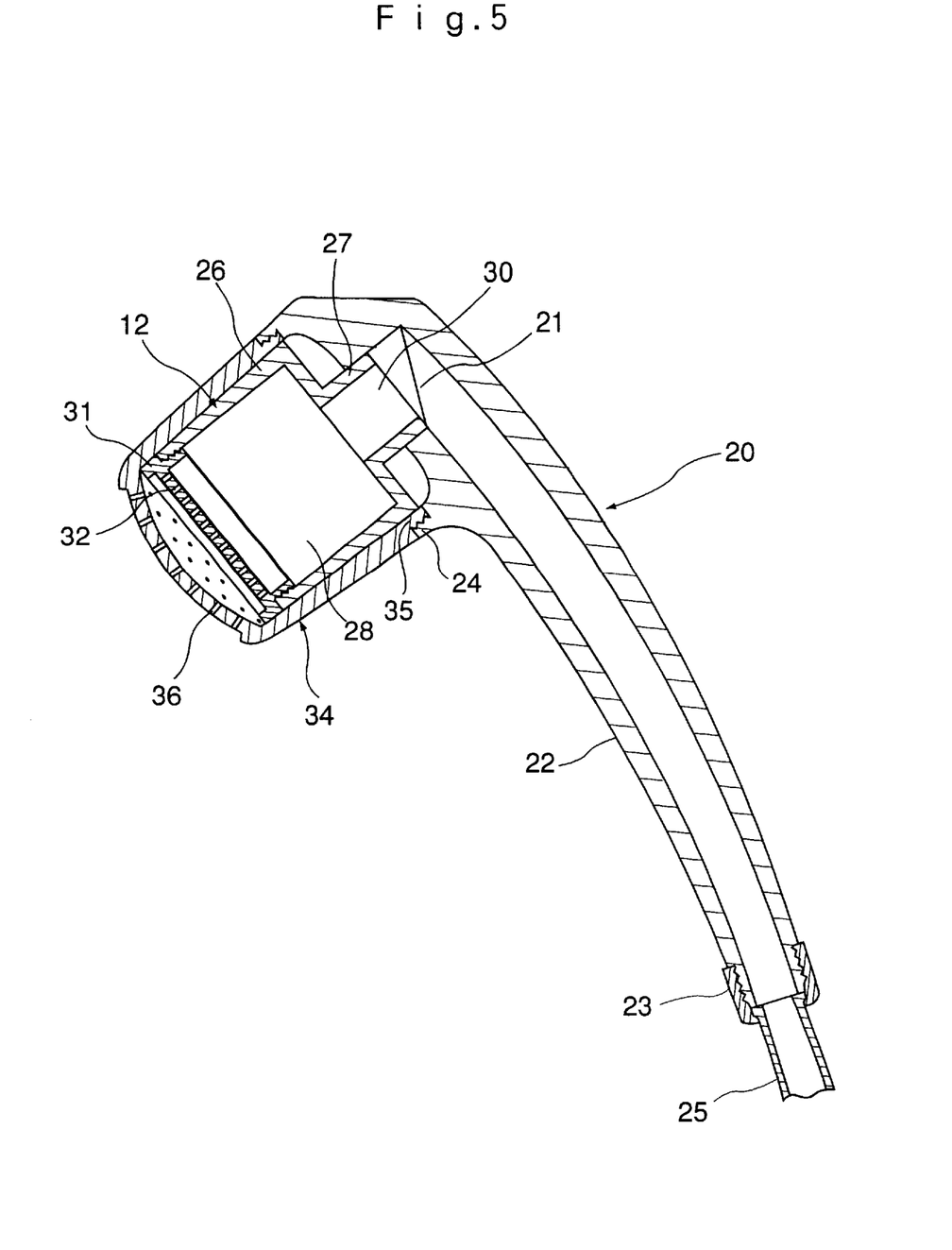
FIG. 5 is a sectional view showing a shower head having a water purifying apparatus.
Figure 6:
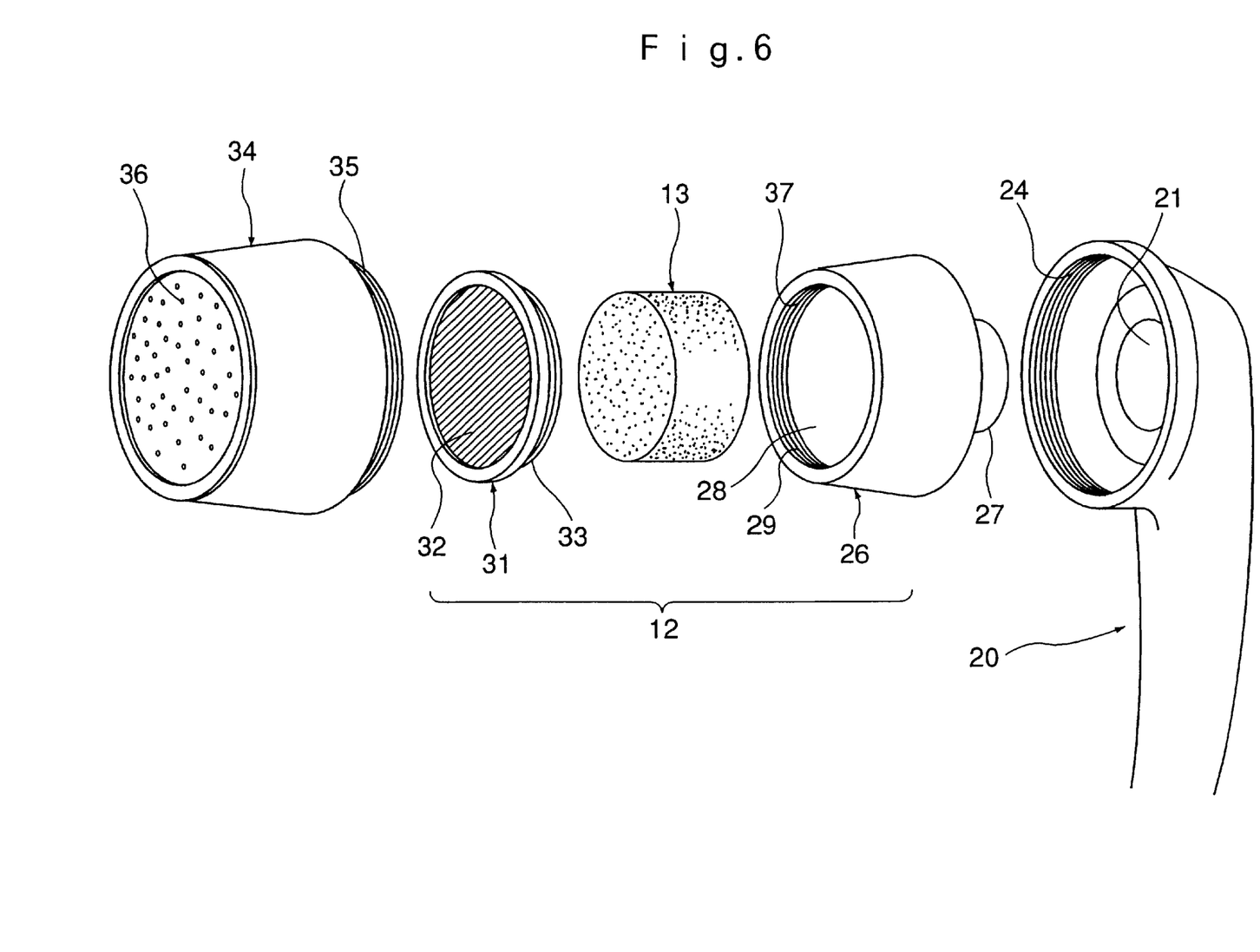
FIG. 6 is an exploded perspective view showing the shower head having the water purifying apparatus of FIG. 5.
Figure 7:
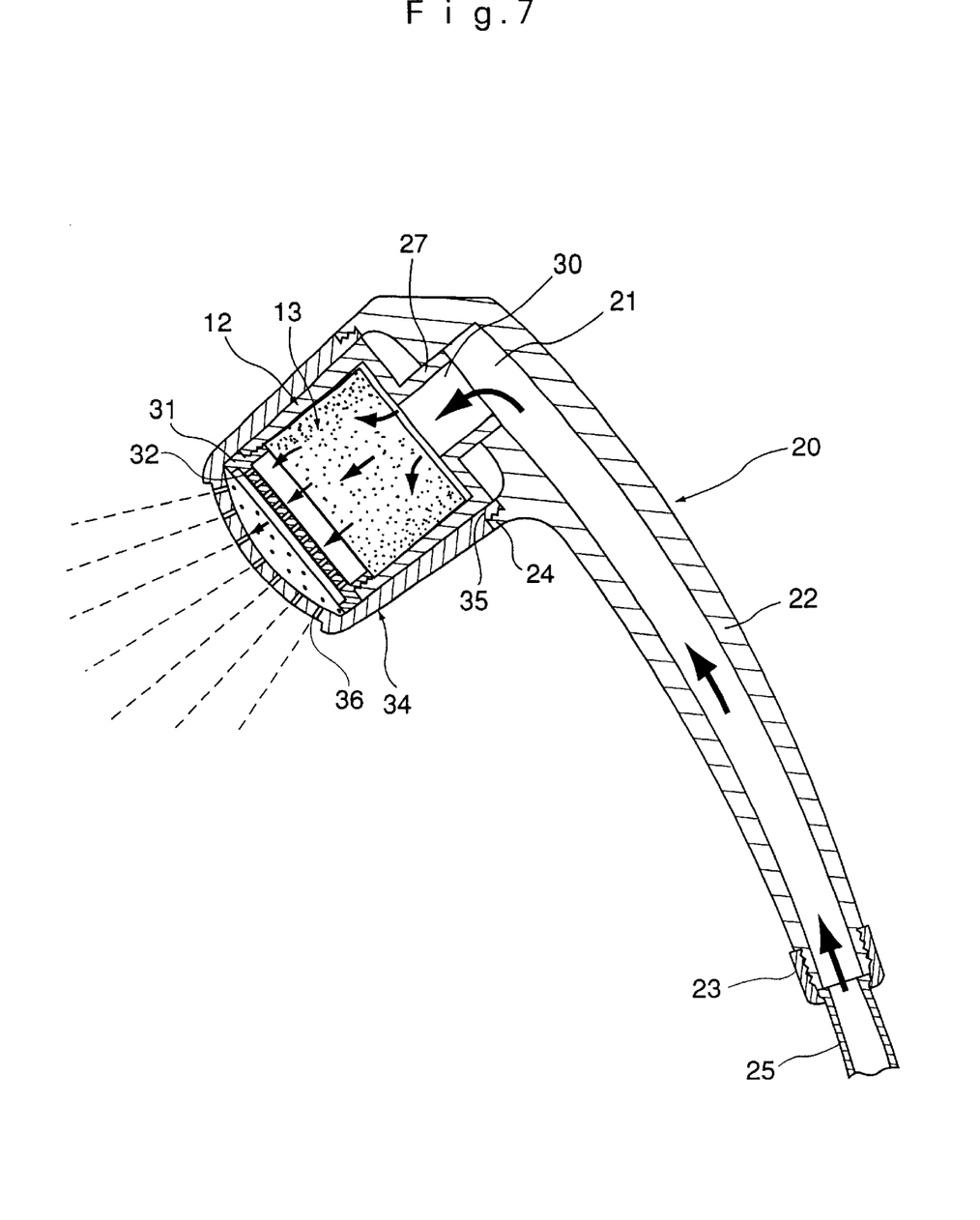
FIG. 7 is a sectional view showing an example of use of the shower head having the water purifying apparatus.

FIG. 5 through FIG. 7 are sectional views of mounting the water purifying apparatus 12 in FIG. 1 directly installed on a shower head main body 20. FIG. 5 is a sectional view of mounting the water purifying apparatus 12 containing no water-soluble non-crystalline substance 13 as the purifying material in a hollow container 26 directly on the shower head main body 20. FIG. 6 is an exploded perspective view of mounting the water purifying apparatus 12 directly on the shower head main body 20. FIG. 7 is a sectional view showing the state of use of the shower head incorporating the water purifying apparatus 12.

In FIGS. 5, 6 and 7, the shower head main body 20 is composed of a shower head main body grip 22, a flow outlet leading end 34, and a water channel outlet 21 in the shower head main body. The shower head main body grip 22 and flow outlet leading end 34 can be separated from each other. That is, the shower head main body grip 22 has a connection threaded portion 24 in the inner peripheral surface of the flow outlet leading end 34 at one end. The flow outlet leading end 34 has a connection threaded portion 35 at a flow outlet leading end to be coupled with the connection threaded portion 24 of the shower head main body grip 22 at one end. The other end of the flow outlet leading end 34 has a plurality of shower head flow outlets 36 for discharging water.

The water purifying apparatus 12 has the container 26 and a water permeable lid 31. The container 26 has a space 28 for setting the purifying material therein. The container 26 has an opening 37 for inserting the purifying material at one side. The inner peripheral surface of the opening 37 has a connection threaded portion 29 at the container side. The container 26 has a flow inlet 30 with a convex section for flow feeding water into the container 26 at the other side. The outer peripheral surface of the flow inlet 30 constitutes a junction 27 of the water purifying apparatus.

The bulk of water purifying material is inserted into the space 28 from the opening 37 at one side, and the lid 31 having the flow outlet 32 on the surface and the connection threaded portion 33 on the outer peripheral surface are joined to the opening 37 of the container 26. Thus, the water purifying apparatus 12 is completed.

Next, the junction 27 of the water purifying apparatus formed on the outer peripheral surface of the flow inlet 30 provided in the container 26 of the water purifying apparatus 12 is joined to the inner peripheral surface of the water channel outlet 21 in the shower head main body. After that, the flow outlet leading end 34 is mounted to the shower head main body grip 22. Thus, the shower head incorporating the water purifying apparatus is completed.

Water is fed into the shower head main body 20 from a hose 25. Accordingly, water is sent into the water purifying apparatus 12 through the water channel outlet 21 in the shower head main body. At this time, water passes in the bulk of the water-soluble non-crystalline substance 13 as the purifying material inserted in the water purifying apparatus 12. At this time, since ions are released into water from the water-soluble non-crystalline substance 13, water can be reformed into soft water from hard water. The reformed water passes through the flow outlet 32 of the lid 31, and flows out in shower from the flow outlet 36 of the shower head. This kind of water can be used as household water except for drinking water.

Figure 8:
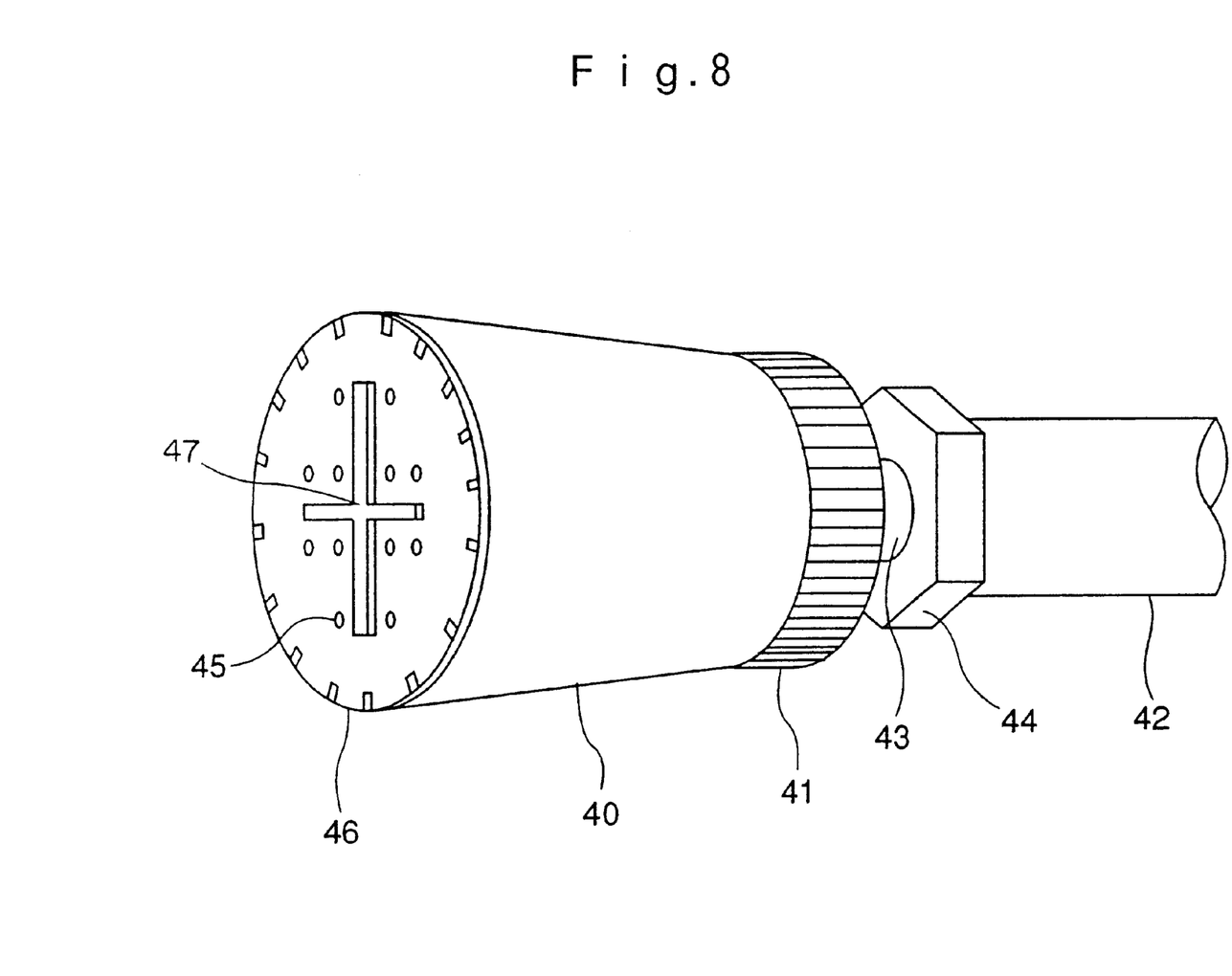
FIG. 8 is a schematic view showing another shower head having the water purifying apparatus.
Figure 9:
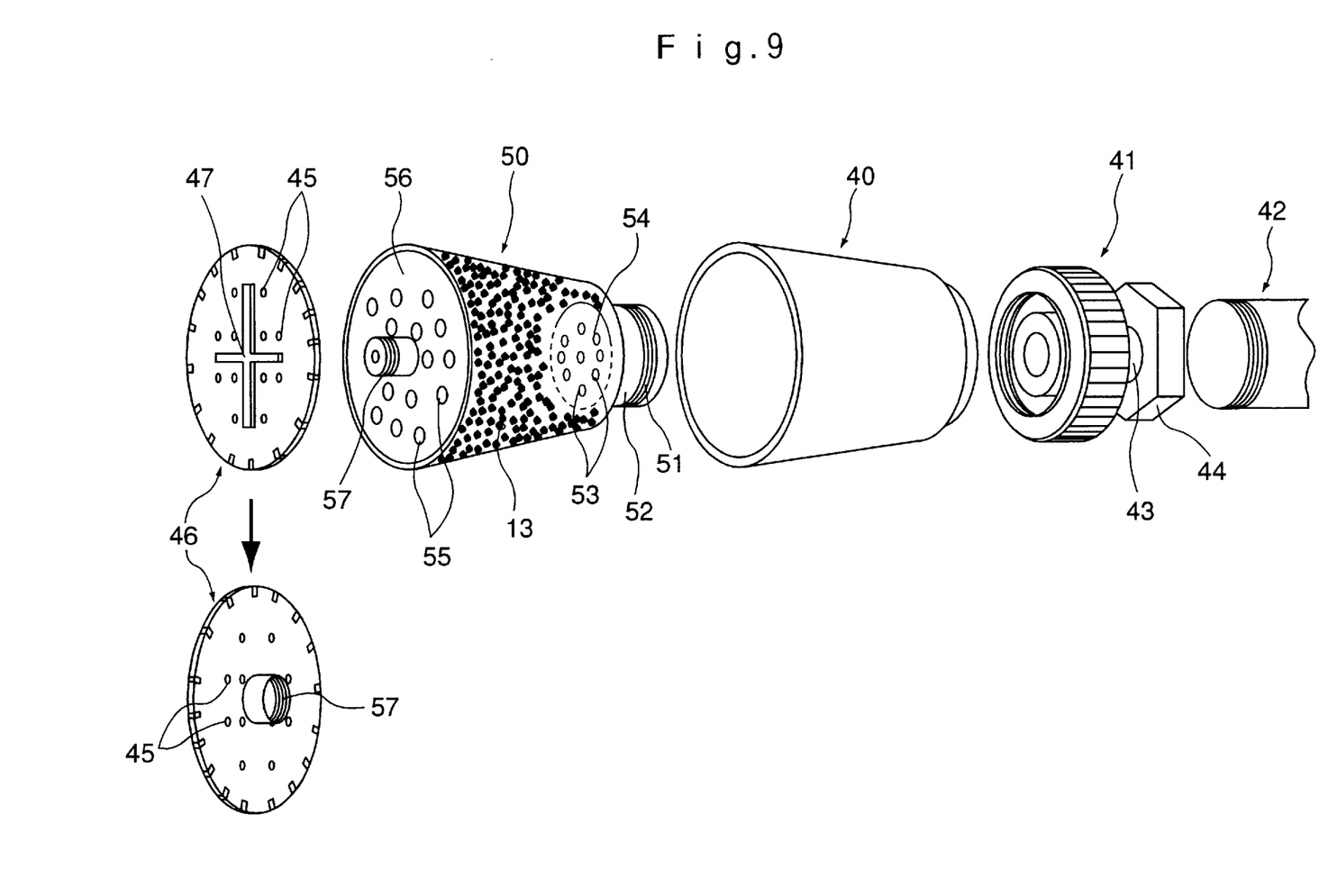
FIG. 9 is an exploded perspective view showing the shower head having the water purifying apparatus of FIG. 8.

FIG. 8 is a schematic diagram showing another shower head having the water purifying apparatus. FIG. 9 is an exploded perspective view showing the shower head having the water purifying apparatus in FIG. 8.

In the drawing, a reference numeral 40 represents an accommodating container with a hollow interior space for accommodating the purifying material. The accommodating container 40 constitutes a shower head. The accommodating container 40 is coupled by a mounting body 41. The mounting body 41 of the accommodating container 40 is coupled to the shower main body 42 using a fitting nut 44 having a water passing pipe 43. The accommodating container 40 is coupled to an upper lid 46 having multiple flow-out ports 45 at the opposite side of the mounting main body 41. The lid 46 has a handle 47 which is turned for opening/closing.

The accommodating container 40 contains an accommodating body 50 containing the purifying material. The accommodating body 50 has a pipe 52 with a mounting screw 51 coupled to the mounting body 41 at one side. The accommodating body 50 has a lid 54 provided with multiple flow-in holes 53. The accommodating body 50 has a lid 56 provided with multiple flow-out holes 55. The lid 56 has a mounting screw 57 for coupling to the upper lid 46 through screw.

The purifying material contained in the water purifying apparatus 12 is composed of water-soluble non-crystalline substance and activated carbon. The water-soluble non-crystalline substance 13 is bulky. The water-soluble non-crystalline substance is amorphous. As the amorphous material is used as the purifying material, the surface area contacting with water is wider. As a result, the amount of water in contact with the purifying material in the water purifying apparatus 12 per unit time can be increased. Thus, the dimensions of the water purifying apparatus 12 can be decreased.

When passing water into the shower head, the purifying material contains 20 to 30 g of the activated carbon relative to 20 g of the water-soluble non-crystalline substance having the following composition. The flow rate is 9.5 liters/min. Herein, the rate of composition of the water-soluble non-crystalline substance 13 is 5.00 to 30.0% of silica, 7.00 to 30.0% of boron, 3.00 to 25.0% of sodium, and 0.30 to 1.80% of silver. Herein, the activated carbon is present as a suspension.

By passing water with the purifying material contained in the shower head, and by passing water without containing the purifying material, the number of Legionella cells contained in water was compared. At the water flow rate of 9.5 liters/min, without passing through the purifying material, the Legionella cell count was 1.5×10, and when measuring by passing through the purifying material, no Legionella cell was detected. Moreover, by passing hard water, it was reformed into soft water.

Other components of the water-soluble non-crystalline substance as the purifying material inserted into the hollow container of the purifying apparatus are explained below.

That is, the composition of the water-soluble non-crystalline substance includes 12.00 to 60.0% of silica, 6.00 to 50.0% of sodium, and 0.30 to 1.80% of silver. Or the composition of the water-soluble non-crystalline material includes 12.00 to 60.0% of silica, 6.00 to 50.0% of calcium, and 0.30 to 1.80% of silver. Alternatively, the composition of the water-soluble non-crystalline material includes 12.00 to 60.0% of silica, 6.00 to 50.0% of potassium, and 0.30 to 1.80% of silver.

At the rate of this composition, as a result of comparison of Legionella cell count contained in water, when water was not passed through the purifying material, Legionella cells were detected, but when measured after passing through the purifying material, no Legionella cell was detected. By passing the hard water, moreover, it was reformed into soft water.

According to the water purifying apparatus of the invention, not only the water is purified, but also it presents a water purifying apparatus preferably capable of providing water with buffering property (buffering effect), that is, making water mild (less stimulating), reforming household water from hard water to soft water, and having bactericidal or antibacterial effect.

The water-soluble non-crystalline substance is bulky and formed as the amorphous, and hence the contact surface area with water is wider than in the related art such that the water purifying apparatus can be reduced in size.

FIG. 1
5 Threaded portion
3 Rear case
2 Front case
FIG. 2
12 Water purifying apparatus
8 Mounting threaded portion
6 Combination threaded portion
4 Anti-slipping portion
7 Mounting threaded portion
11 Flow inlet
13 Water-soluble non-crystalline substance
10 Flow outlet
3 Rear case
2 Front case
14 Case
FIG. 5
20 Shower head main body
22 Shower head main body grip
FIG. 6
13 Water-soluble non-crystalline substance
37 Opening
24 Connection threaded portion
21 Water channel outlet for shower head main body
36 Shower head flow outlet
34 Flow outlet leading end
35 Connection threaded portion
32 Flow outlet
31 Lid
33 Connection threaded portion
28 Insertion space for filter medium
29 Connection threaded portion
26 Case
27 Water purifying apparatus junction
12 Water purifying apparatus
20 Shower head main body
FIG. 9
Top surface
Back surface

What is claimed is:

1. A water purifying apparatus, comprising a hollow container, and a purifying material provided in said hollow container, wherein the purifying material includes a water-soluble non-crystalline substance containing silver and activated carbon in a ratio of about 1:1.5 by weight.

2. The water purifying apparatus according to claim 1, wherein the water-soluble non-crystalline substance is in a bulky form.

3. The water purifying apparatus according to claim 1, wherein the hollow container includes a first case and a second case coupled to each other.

4. The water purifying apparatus according to claim 1, wherein the hollow container includes an accommodating body closed by at least one lid formed with multiple water passing holes.

5. The water purifying apparatus according to claim 1, wherein the purifying material is contained in an water permeable bag disposed within the hollow container.

6. The water purifying apparatus according to claim 1, wherein the hollow container is disposed in a water channel.

7. The water purifying apparatus according to claim 1, wherein the hollow container is disposed in a shower head main body.

8. The water purifying apparatus according to claim 1, wherein the water-soluble non-crystalline substance has an amorphous structure.

9. A water purifying apparatus, comprising a hollow container, and a purifying material provided in said hollow container, wherein the purifying material includes a water-soluble non-crystalline substance and activated carbon in a ratio of about 1:1.5 by weight, and wherein the water-soluble non-crystalline substance includes 5.00 to 30.0% by weight of silica, 7.00 to 30.0% by weight of boron, 3.00 to 25.0% by weight of sodium, and 0.30 to 1.80% by weight of silver.

10. The apparatus of claim 9, wherein the hollow container includes water inlet and outlet positioned so as to allow water to flow from the inlet to the outlet through the purifying material.

11. The apparatus of claim 10, wherein the hollow container is configured as a shower head.

12. A water purifying apparatus, comprising a hollow container, and a purifying material provided in said hollow container, wherein the purifying material includes a water-soluble non-crystalline substance and activated carbon in a ratio of about 1:1.5 by weight, and the water-soluble non-crystalline substance includes 12.00 to 60.0% by weight of silica, 0.30 to 1.80% by weight of silver, and 6.00 to 50.0% by weight of an element selected from the group consisting of sodium, calcium, and potassium.

13. The apparatus of claim 12, wherein the hollow container includes water inlet and outlet positioned so as to allow water to flow from the inlet to the outlet through the purifying material.

14. The apparatus of claim 13, wherein the hollow container is configured as a shower head.

* * * * *